Figures 1, 2, 3, 4, 5:
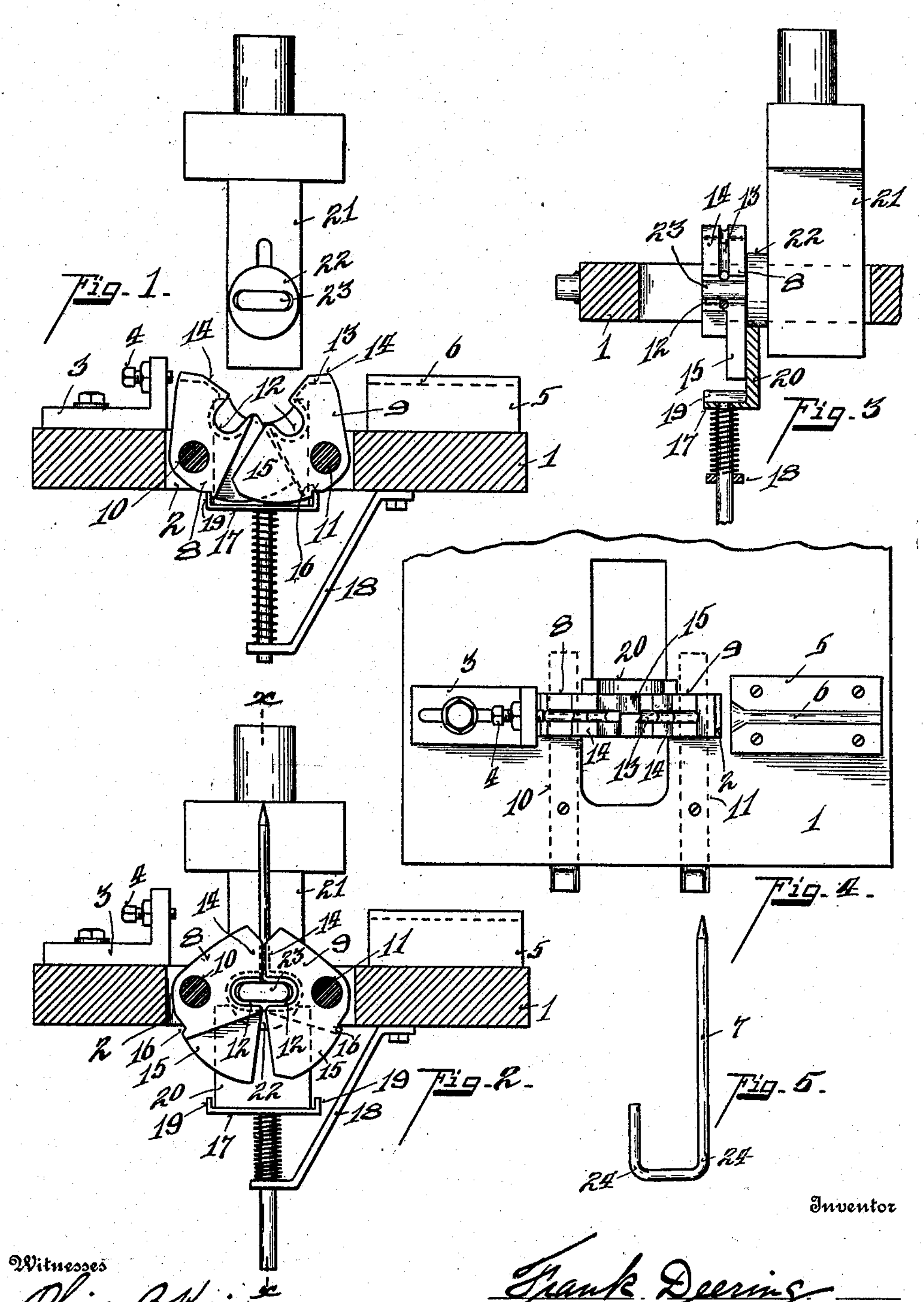

F. DEERING.

WIRE FORMING MACHINE.

APPLICATION FILED JUNE 4, 1908.

911,950. Patented Feb. 9, 1909.

Witnesses

Oliver B. Kaiser

Arthur Faulhaber.

Inventor

Frank Deering

By Wood & Wood

Attorneys

THE NORRIS PETERS CO., WASHINGTON, D. C.

UNITED STATES PATENT OFFICE.

FRANK DEERING, OF COVINGTON, KENTUCKY, ASSIGNOR TO THE PECK, WILLIAMSON HEATING AND VENTILATING COMPANY, OF CINCINNATI, OHIO, A CORPORATION.

WIRE-FORMING MACHINE.

No. 911,950. Specification of Letters Patent. Patented Feb. 9, 1909.

Application filed June 4, 1908. Serial No. 436,607.

*To all whom it may concern:*

Be it known that I, FRANK DEERING, a citizen of the United States, residing at Covington, in the county of Kenton and State of Kentucky, have invented certain new and useful Improvements in Wire-Forming Machines, of which the following is a specification.

My invention relates to a wire or rod forming machine.

The object of the invention is to provide a simple mechanism for forming in one operation a wire handle or hook, or similar article, from a straight wire blank.

The features of the invention are more fully set forth in the description of the accompanying drawings, forming a part of this specification, in which:—

Figure 1 is a front elevation, showing the table in section, the jaws being open. Fig. 2 is a similar view with the jaws closed upon the completed article. Fig. 3 is a section on line *x*—*x*, Fig. 2. Fig. 4 is a top plan view with the plunger removed. Fig. 5 is a perspective view of the wire after the first bending step.

1 is the table having a slot 2, in which the forming mechanism is placed in proper juxtaposition to the table.

3 represents a bracket on the table having an adjustable stop bolt 4. 5 represents a block on the other side of the table having a groove 6 for receiving the wire.

8, 9, represent forming jaws pivoted at 10, 11, respectively, the said jaws being placed in the slot 2. The jaws have the forming dies 12 upon their inner faces, and a groove 13 which runs transversely through the jaws and pocket in alinement with the groove 6, the handle portion of the article occupying the groove within the jaws. The upper ends of the jaws 14 abut endwise upon the completed article when the jaws are closed, as shown in Fig. 2. The lower ends of the jaws have the projections 15 offset so as to lie in parallel planes enabling them to pass one another when the jaws are opened so as to occupy the position shown in Fig. 1. The outer edges of the projections 15 are provided with locking notches 16 lying under the pivots.

17 represents a spring plunger supported by strap 18 under the table and occupying a position under the jaws. It is provided with the locking member 19, the upturned ends of which enter the notches 16 when the jaws are open, automatically locking them in this position. Member 17 carries an upward extension 20 for coöperation with the reciprocating forming plunger for the purpose of automatically unlocking the jaws.

21 represents a vertically reciprocating forming plunger operated through any suitable mechanism, which need not be shown. It carries an annular boss 22 for coöperating with the extension 20 in the downward movement of the reciprocating plunger. On the outer end of the boss 22 is the forming die 23. The forming die 23 and the jaw dies 12 are shaped to produce the hook or handle formation of the article to be struck up. The forming die may be adjustably supported relative to the reciprocating plunger.

Mode of operation. The straight wire is placed in groove 6 of block 5 and in the upper end of groove 13 of jaws 8, 9, with its end abutting the stop bolt 4. The parts are in the position shown in Fig. 1 with the jaws locked apart. The reciprocating plunger 21 is actuated, and as the die 23 engages the wire 7 it imparts the double right angled bend 24, shown in Fig. 5. As the reciprocating plunger continues its descent below the plane of the table, the member 22 engages the member 20 and depresses the spring plunger 17, releasing lock member 19 from notches 16, so that the downwardly moving plunger swings the jaws to closed position, bending inwardly the vertical portions of the wire and completing the hook or loop formation in a single movement of the plunger. As the plunger is retracted it opens the jaws, the spring actuated plunger 17 follows and automatically relocks the jaws in open position for the next forming operation.

The simplicity, quickness and efficiency of the mechanism are obvious.

Having described the invention, I claim:—

1. In a wire forming device, a reciprocating plunger and pivoted jaws having coöperating forming dies, means for supporting the wire relative to the dies, and means actuated by the reciprocating plunger for automatically unlocking the jaws, substantially as described.

2. In a wire forming device, a reciprocating plunger and pivoted jaws having coöperating forming dies, means for supporting the wire relative to the dies, the plunger being adapted to close and open the jaws in its reciprocation, and means actuated by the plunger adapted to automatically lock the jaws in open position and unlock them during the descent of the plunger, substantially as described.

3. In a wire forming device, a reciprocating plunger and pivoted jaws having coöperating forming dies, means for supporting the wire relative to the dies, the jaw dies being adapted to close over the plunger die in the descent of the plunger and to be opened by the rise of the plunger, and means actuated by the plunger adapted to automatically lock the jaws in open position when the plunger is raised and to unlock them when the plunger descends, substantially as described.

4. In a wire forming device, a reciprocating plunger and pivoted jaws having coöperating forming dies, means for supporting the wire relative to the dies, the jaws having a pivotal relation whereby the reciprocation of the plunger closes and opens the jaws, a spring-actuated plunger adapted to be depressed by the reciprocating plunger, and locking devices between the spring-plunger and jaws, substantially as described.

In testimony whereof, I have hereunto set my hand.

FRANK DEERING.

Witnesses:
OLIVER B. KAISER,
LEO J. O'DONNELL.